United States Patent [19]

Kuss et al.

[11] Patent Number: 5,064,240
[45] Date of Patent: Nov. 12, 1991

[54] DISPLACEMENT COVER FOR A TRUCK BODY OPENED-TOP BED

[75] Inventors: Thomas N. Kuss; Donald L. Horne, both of Prestonburg, Ky.

[73] Assignee: Truck Covers Inc., Prestonsburg, Ky.

[21] Appl. No.: 664,279

[22] Filed: Mar. 4, 1991

[51] Int. Cl.5 .............................................. B60J 7/08
[52] U.S. Cl. .................... 296/100; 248/166; 248/188.6
[58] Field of Search .......................... 296/100, 26, 27; 248/166, 188.6

[56] References Cited

U.S. PATENT DOCUMENTS

| | | | |
|---|---|---|---|
| 3,155,423 | 11/1964 | Cripe | 296/100 |
| 3,317,239 | 5/1967 | Tantlinger | 296/100 |
| 3,376,059 | 4/1968 | Corl | 296/26 X |
| 3,765,716 | 10/1973 | Van Gompel | 296/100 |
| 4,613,181 | 9/1986 | Rofi-Badeh | 296/100 |

Primary Examiner—Robert R. Song
Attorney, Agent, or Firm—Dykema Gossett

[57] ABSTRACT

A vertically displaceable rigid cover for a truck bed is connected to the truck bed by many of pair of linkages on each side of the truck bed. A fluid pressure actuated cylinder is associated with each linkage for lifting and lowering the rigid cover, and for causing a portion of each linkage to be received into and continuously urged against a vertical stop means mounted on the truck bed.

20 Claims, 3 Drawing Sheets

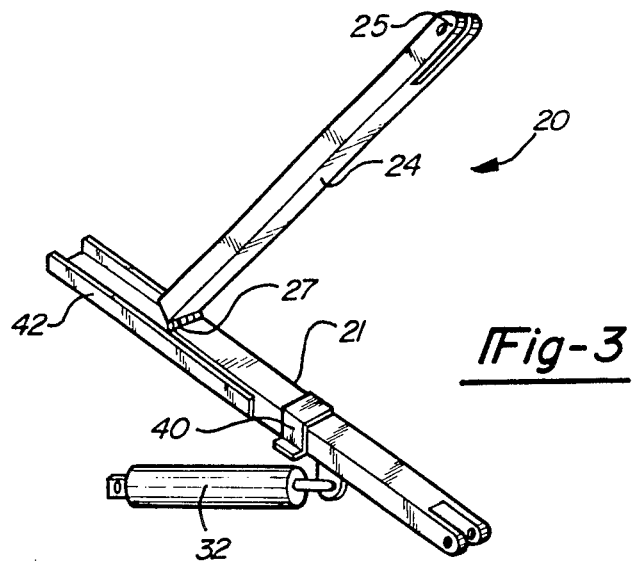
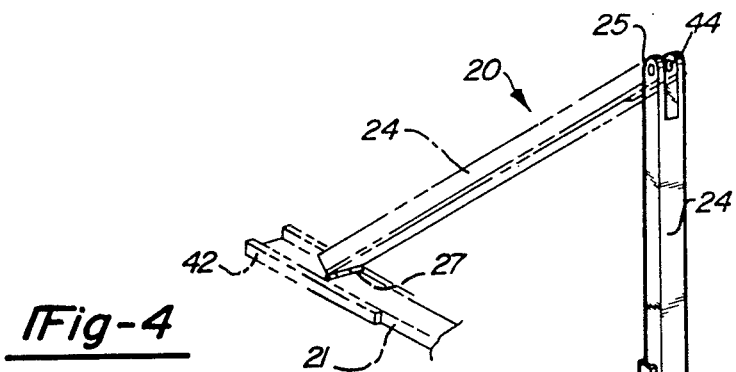
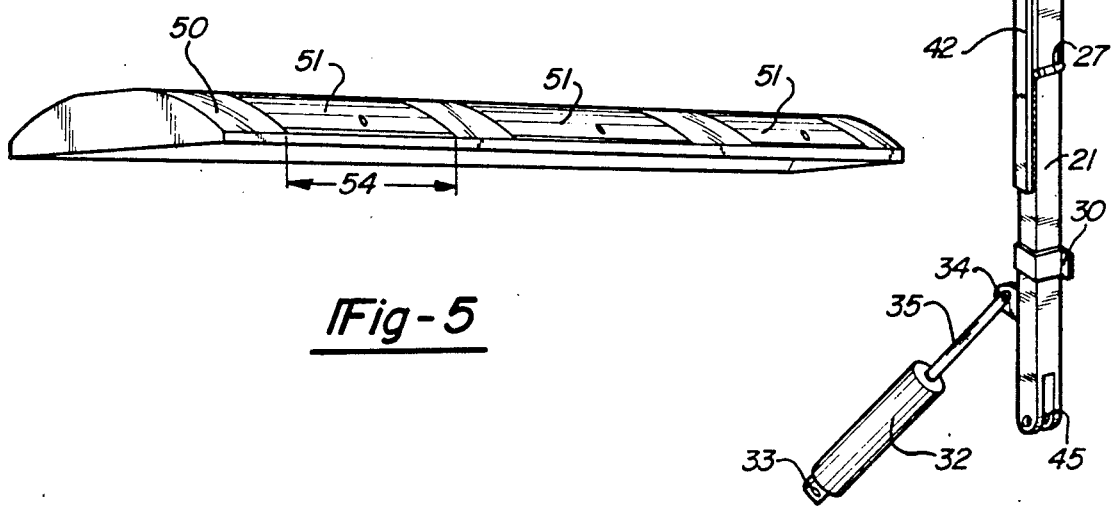

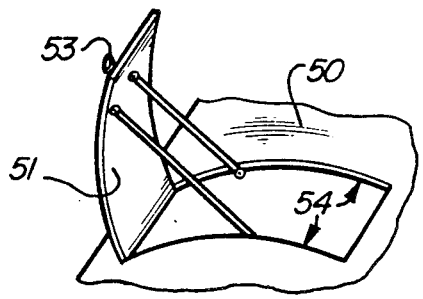
_Fig-6_
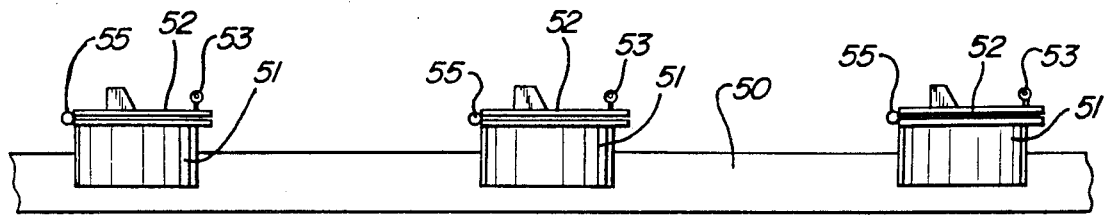
_Fig-7_
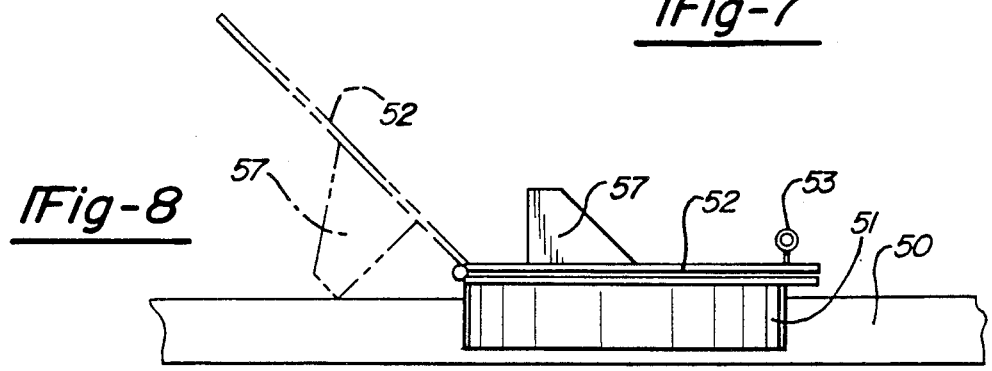
_Fig-8_
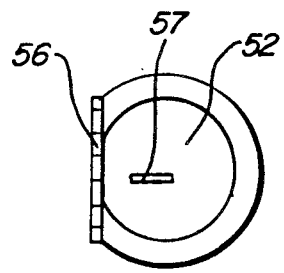
_Fig-9_

DISPLACEMENT COVER FOR A TRUCK BODY OPENED-TOP BED

The present invention relates to a vertically displaceable cover for a truck body having an opened-top container bed, and more particularly to such trucks which are intended to carry in the bed materials which can spill from the bed or be blown from the bed during movement of the truck. Typically, such trucks may carry coal, trash, building materials, gravel, sand, grain, and the like.

BACKGROUND OF THE INVENTION

It has been a constant problem in the art to provide satisfactory covers for truck body container beds having an open top, where those trucks are intended to carry materials which can spill from, or be blown from, the opened top of the bed during transit of the truck. Typically, in the art, the truck body opened-top container bed has been covered with tarpaulins, e.g. canvas tarpaulins, but such tarpaulins are difficult and time consuming to securely fasten to the open top of the bed, and in some cases, the fastening of a tarpaulin is a somewhat dangerous operation, in view of the height of the truck and the material being carried by the truck. Likewise, when the truck is to be unloaded, the tarpaulin must be removed, with the same disadvantages. Further, in view of the difficulties of attaching and removing the tarpaulin, many operators of such trucks are less than accurate in installing the tarpaulin, and during transit of a truck, it is a common experience for materials to be spilled or blown from trucks, even from trucks carrying a tarpaulin.

In view of the foregoing, the art has attempted to provide vertically displaceable, liftable tops for opened container bed trucks, but heretofore, these efforts have been, primarily, limited to small trucks, e.g. pick-up trucks, and the mechanisms for vertically displacing a liftable top have been somewhat complex, expensive to produce, and unsure in operation from a safety point of view. For example, U.S. Pat. No. 3,155,423 discloses a liftable truck top, but the mechanism used for that lifting requires extensive modification of the truck bed, is expensive to produce, and cannot provide assurance of the top being stably maintained in the lifted position. This latter concern is of particular importance in larger trucks, such as those described above, since the liftable top will be quite heavy, and should that liftable top collapse while the truck bed is being loaded, workers loading the truck could be seriously injured if struck by that top. Somewhat similarly, U.S. Pat. No. 3,765,716 discloses a liftable top and more positive locking for the top in the raised position, but here again, the mechanism for such lifting is complex, requires substantial modification of the truck, and is expensive to produce.

For relatively light liftable truck tops, especially for pick-up trucks and the like, the art has proposed more simple spring-loaded lifting arms, but here again, such mechanisms would not be appropriate for large trucks, such as described above, where the liftable top is relatively heavy, and U.S. Pat. No. 4,613,181 is representative thereof.

Another approach in the art is to provide a top which is tiltable relative to the truck bed, and here again, such mechanisms are useful only for relatively small trucks, such as pick-up trucks, and U.S. Pat. No. 4,819,981 is representative thereof.

On the other hand, for large trucks, such as the trucks noted above, and semi-trailer trucks, liftable covers have not been successful, primarily because the covers proposed in the art are complicated in the mechanisms for lifting, cannot provide positive assurance of the cover remaining in the lifted position while the truck is loaded or unloaded, and provide relatively little distance between the top of the bed of the truck and the underside of the cover when the cover is in the raised position, which severely limits the utility of the truck in terms of loading and unloading the truck, and U.S. Pat. No. 3,317,293 is representative thereof.

For large trucks of the present nature, in order to make a displaceable, liftable cover practical, the cover must be capable of being displaced with simple to operate mechanisms, such that extensive training, for safety purposes, is not necessary. The lifting mechanism must assure that the cover is lifted in a predictable manner, and when the cover is in the raised position, the cover must be vertically displaced from the bed of the truck a sufficient distance that easy access to the bed of the truck may be had by conventional loading equipment, such as a front-end loader. Also, when the cover is in the raised position, an automatic mechanism must be provided to ensure that the cover stays in that raised position during loading or unloading of the truck and that the cover cannot precipitously fall during such loading or unloading. It would, therefore, be a substantial advantage to the art to provide a displaceable, liftable truck cover with the foregoing characteristics.

BRIEF DESCRIPTION OF THE INVENTION

The present invention is based on three major considerations for providing a vertically displaceable cover for a truck of the above-described nature. Firstly, the cover must have a rigid frame over which a covering material may be disposed for providing a secure cover to the bed of a truck, so that material carried in the truck, e.g. coal or gravel, cannot be displaced from the bed of a truck during transit of the truck. Secondly, the frame carrying the cover must automatically go from a lowered position to the raised position with essentially no operator control, other than the operator starting the movement of the cover from the lowered position to the raised position. Thirdly, once the cover is in the raised position, it must be maintained in that position, automatically, and without any necessity for the operator to actuate any safety device for maintaining the cover in that position.

Thus, the present invention provides a vertically displaceable, liftable cover for a truck body having an opened-top container bed. The bed, as is common with such trucks, has a bed bottom and bed walls where the uppermost portions of the bed walls form a bed top perimeter. The cover for such truck comprises a rigid frame with frame members and the lowermost portion of those frame members forms a frame bottom perimeter. That frame bottom perimeter has a configuration which substantially corresponds to the bed top perimeter, so that when the cover is in the lowered position, it contacts, fits onto, and is supported by the bed top perimeter of the bed of the truck.

The frame has a cover means attached thereto, and the cover spans the frame, so as to provide a continuous cover over the frame, whereby the opened top of the truck bed is enclosed by the cover when the cover is in the lowered position.

In order to move the cover from the lowered position to the raised position, and, of course, to move the cover from the raised position to the lowered position, a pair of lifting means are disposed on opposite sides of the truck bed. Normally, the lifting means will be disposed on the two longer sides of the truck bed, but for particular truck configurations, a pair of lifting means can be disposed on the front and back of the truck bed. Each lifting means has a lower leg with a lower leg end pivotably attached to a bed wall and an upper leg with an upper leg end pivotably attached to a frame member and a hinge in between the two legs, so that a scissor action of the lifting means, about the hinge, can occur. With such scissor action, when the frame is in a lowered position, it is substantially adjacent to the bed top perimeter (and resting thereon) and the scissor action will cause the legs of the lifting means to be in a somewhat horizontal or inclined and at least partially folded configuration around the hinge. On the other hand, when the cover is in the raised position, the frame is substantially vertically displaced from the bed top perimeter, and the legs of the lifting means are in a substantially vertical and unfolded configuration, by reason of the scissor action of the lifting means. In order to provide safety when the cover is in the raised position, a vertically-disposed stop means is provided for each lifting means, and that stop means is attached to a bed wall. The stop means will receive one of the legs of the lifting means when the frame is in the raised position, such that the leg means cannot be moved, via the scissor action, to a configuration other than a vertical disposition of the legs.

To cause that scissor action of the legs, a fluid pressure actuated cylinder is associated with each lifting means. A first end thereof is pivotably attached to a bed wall, and a second end thereof is pivotably attached to the lower leg of the lifting means. Either the first end or the second end of the cylinder is an extendable cylinder rod, so that the extension of the cylinder rod achieves the scissor action described above.

Fluid pressure means are provided for supplying pressurized fluid to each of the cylinders. This, of course, causes the cylinder to actuate, the cylinder rod to be moved out and act upon the lower leg of the lifting means for causing the above-described scissor action. Thus, the fluid pressure causes the cylinder rod to extend, causes the frame in the lowered position to be moved to the raised position, and causes a portion of each lifting means to be received into a vertically disposed stop means. Since when that portion of the lifting means is received into the vertically disposed stop means, and since the lifting means cannot, therefore, pass beyond a vertical configuration, the stop means ensures that the lifting means will remain in that vertical configuration.

However, in order to maintain the lifting means in the vertical configuration, and to ensure the safety of the workers when the cover is in the raised position, the fluid pressure means continues to exert fluid pressure and urge that portion of the lifting means into the stop means, whereby a positive force maintains the lifting means tightly against the stop means and therefor ensures that the cover will remain in the raised position so long as the fluid pressure is applied to the fluid pressure actuated cylinder.

BRIEF DESCRIPTION OF THE DRAWINGS

FIG. 3 shows one of the lifting means in a folded configuration, when the cover is adjacent to the bed top perimeter.

FIG. 4 shows that same lifting member when the cover is displaced from the bed top perimeter.

FIG. 5 shows a cover means for the frame;

FIG. 6 shows covers for ports of the cover of FIG. 5;

FIG. 7 shows optional ports and covers for the cover of FIG. 5;

FIG. 8 shows details of such port covers;

FIG. 9 is a top view of FIG. 8.

DETAILED DESCRIPTION OF THE INVENTION

Figure 1:
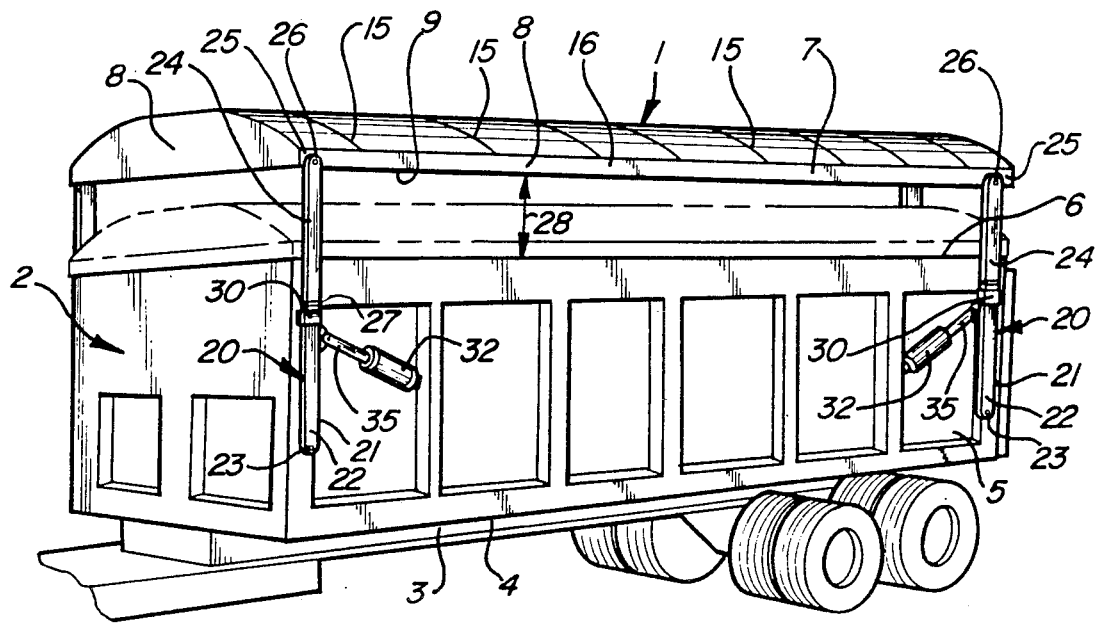
FIG. 1 is a diagrammatic isometric view of an open-top truck container bed, and the frame of the present cover.

FIG. 1 shows a vertically displaceable cover frame 1 which is fitable onto an opened-top container bed 2 carried by a truck body 3. The bed has a bed bottom 4 and bed walls 5. The uppermost portions of the bed walls 5 form a bed top perimeter 6.

In FIG. 1, the frame 7 is shown in a raised position, the frame has frame members 8 with the lowermost portions thereof forming a frame bottom perimeter 9. As can be seen from FIG. 1, the frame bottom perimeter 9 has a configuration which substantially corresponds to the bed top Perimeter 6.

While the frame can be in any configuration, since the bed will normally be in the general configuration of a rectangle, the frame will also be in the general configuration of a rectangle, as shown in FIG. 1. Preferably, the frame has support cross-ribs 15 spanning the frame, and more preferably, those cross-ribs span the frame from a longer side 16 of the frame to the opposite longer side of the frame. More preferably, these ribs will be arcuate, so as to provide a slight dome to a cover over the ribs. A cover means is supported by the cross-ribs, as described more fully hereinafter, and usually that cover means is metal sheeting, such as aluminum sheeting or steel sheeting (see the metal sheeting cover means of FIG. 5).

Also, as shown in FIG. 1, there is a pair of lifting means, generally 20, disposed on opposite sides of the truck bed. As noted above, the lifting means could be at the front and back of the bed, for special bed configurations and purposes, but usually those lifting means will be disposed on longer sides of the bed.

Each lifting means has a lower leg 21 with a lower leg end 22 which is pivotably attached to a bed wall, e.g. by means of a pivot pin 23. Likewise, there is an upper leg 24 having an upper leg end 25 which is pivotably attached to a frame member 8, and, again, such attachment is conveniently made, for example, by way of a further pivot pin 26.

A hinge 27 is disposed between the upper and lower legs, and, preferably, the hinge is substantially equidistant from lower leg end 22 and upper leg end 25, so that when the frame is moved from the lower position to the raised position the upper leg end 25 always remains vertically disposed above the lower leg end 22, as explained in more detail below in connection with FIG. 4.

As noted above, the separating distance between the bed top perimeter and the frame bottom perimeter must be sufficient for adequate loading and unloading of the truck bed. Arrows 28 illustrate the separating distance. Preferably, when the cover is in the raised position, that separating distance between the bed top perimeter 6 and the frame bottom perimeter 9 is sufficient that a bucket of a front-end loader may be passed therebetween. Usually, this will require a separating distance of at least five feet, but more often, that separating distance will be at least six feet, and more preferably at least seven feet. When loading coal with a front end loader, at least ten feet or more should be provided.

Figure 2:
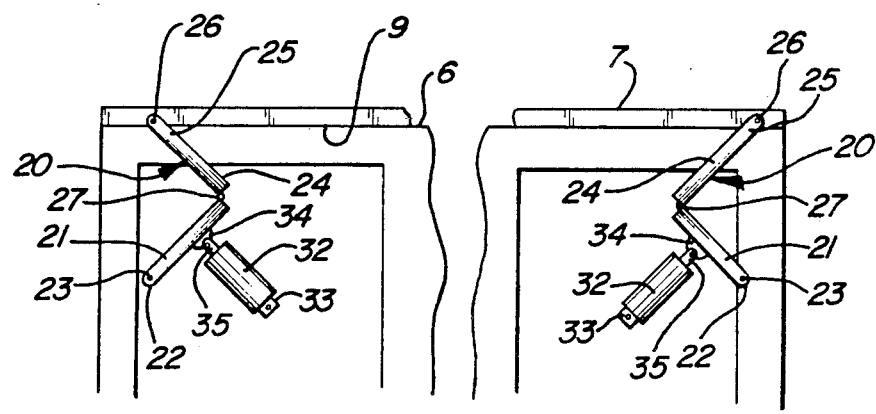
FIG. 2 is a diagrammatic illustration of the scissor action of the lifting means for lifting the cover from the truck bed.

As illustrated in FIG. 2, which diagrammatically illustrates frame 7 in a lowered position, when the frame is in a lowered position, the frame is substantially adjacent to the bed top perimeter 6 and the lower leg 21 and upper leg 24 (the legs of the lifting means) are in a somewhat horizontal or inclined and at least partially folded configuration around hinge 27. However, when the frame is in a raised position, as illustrated in FIG. 1, the frame is substantially vertically displaced from the bed top perimeter 6, and the legs 21 and 24 of the lifting means 20 are in a substantially vertical and unfolded configuration. Thus, the length of the legs, in the vertical configuration, determines the maximum separating distance between the bed perimeter and the frame perimeter. Accordingly, the length of each leg will be made such that the two legs, when in the vertical position, will achieve the desired separating distance between the frame perimeter and the bed perimeter.

A vertical stop means 30 is attached to the bed walls 5, and one vertical stop means is provided for each lifting means. The vertical stop means receives a leg of the lifting means 20, when the frame is in the raised position. The vertical stop means may be any solidly attached abutment for receiving a leg of the lifting means, usually the lower leg 21, but a conventional right-angle bracket is quite sufficient in this regard.

A fluid pressure actuated cylinder 32 is associated with each lifting means, and a first cylinder end 33 is pivotably attached to a bed wall 5, and a second cylinder end 34 is pivotably attached to the lower leg 21 of lifting means 20, and either the first end 33 or the second end 34 is an extendable cylinder rod. As shown in FIG. 1, the second end 34 is in the form of an extendable cylinder rod 35.

Fluid pressure means well known in the art are provided for supplying pressurized fluid to each of the cylinders 32, for causing the cylinder rod to extend, for causing the frame 7 in the lowered position to be moved to the raised position, for causing a portion of each lifting means to be received into respective vertically disposed stop means 30, and for continuing to urge that portion of the lifting means into the stop means, so that the cover is moved to and maintained in the raised position. Normally, the fluid pressure means is the fluid pressure means associated with the truck body, i.e. that pressure means used for operating other devices on the truck body or the brakes. Thus, the fluid pressure means is usually a hydraulic pressure means associated with the truck body, and very often the fluid pressure means is an air pressure means associated with the truck body.

Referring to FIG. 3, there is a generally horizontal or inclined lower stop means 40 in the form of a right-angle bracket, clip or the like attached to a bed wall 5 for receiving a leg, usually lower leg 21, for each lifting means, when the frame is in the lowered position as shown in FIG. 3. The purpose of the lower stop means is to ensure that the lifting means 20 is not unduly displaced relative to the bed walls 5, during transit of the truck, and to ensure that the lifting means 20 does not adversely affect cylinder 32 or second end 34, such as banging thereinto.

As also shown in FIGS. 3 and 4, each lifting means 20 has at least two elongated leg supports 42 attached to one of the lower leg 21 or the upper legs 24 (shown attached to lower leg 21 in FIG. 3) near the hinge 27 so that when the frame is in the raised position one of the legs is received in and supported by such leg supports. Preferably, as shown in FIG. 3, there are three leg supports disposed on the three sides of the leg not occupied by the hinge. It should be understood that the leg support could be of a one-piece, three-sided, construction if desired.

As can also be seen from FIGS. 3 and 4, when the lifting means 20 is in the folded configuration of FIG. 3 (the frame is in the lowered position), upper pivot point 44 and lower pivot point 45 are vertically disposed one toward the other, as shown by arrow 46. Likewise, when the frame is in the raised position, upper pivot point 44 is also vertically disposed, opposite lower pivot point 45. To best achieve this result, it is preferred that the cylinders 32 push oppositely against lifting means 20 on the same side of a bed wall 5, as shown in FIG. 1. By so oppositely pushing, that vertical alignment of pivot points 44 and 45 can be maintained, until both lifting means 20 are firmly urged against vertical stop means 30 by action of cylinder 32.

Turning now to FIGS. 5 through 9, which show suitable covers for frame 7, it will be noted that cover 50 of FIG. 5 has the generally arcuate shape, as noted above, and it is preferred that this cover be made of metal sheeting. The metal sheeting has at least one port or hatch 51 therein for receiving or removing material into and from the bed, and the port has a removable or displaceable port cover 52 (see FIGS. 6 and 7) thereover and conventional latching means, e.g. latch lifting ring 53. The port, preferably, has a width as shown by arrow 54, of at least 24 inches. However, more preferably, the port is substantially circular, as shown in FIGS. 7-9, and has a diameter of at least about 36 inches. More preferably, as shown in FIGS. 8 and 9, the port cover is hinged at cover hinge 55, which may be a piano hinge 56, as shown in FIG. 10. This prevents the port cover from being displaced from the port either during loading or unloading of the bed, or during transit.

As shown in FIG. 7, there are preferably at least three ports in cover 50. The reason for this is that with many materials carried in such trucks, either loading, or partially unloading, or sampling is advantageously carried out through a port, rather than loading between the opened-top bed and the frame, as discussed above. For example, while a coal truck may be loaded by displacing frame 7 (see FIG. 1) from perimeter 6 of the truck's bed, after loading, the coal is often sampled for quality, consistency and the like, and that sampling is usually done by passing an auger through the depth of the coal and examining a sample thereof. Such augers are usually mounted so that a truck may be pulled thereunder and the auger operated for sampling purposes. Thus, for example, with three ports, in a circular configuration, as shown in FIG. 7, such an auger may be placed into the coal in the bed of the truck through each of the three ports shown in FIG. 7, for sampling of the coal in the truck, at three different places. Raising and lowering the port for such auger operation is usually done by the auger operator by engaging a hooked staff into a latch member, and for that reason, lifting ring 53 is provided. Also, so that port cover 52 can be easily replaced on the circular port, a stop wedge 57 is placed on the top of port cover 52 so that port cover 52 may be rested upon the top of cover 50 (as shown in FIG. 8), and then again easily repositioned by such hooked staff.

As an example of the operation of the cover, a coal truck may be pulled adjacent to a supply of coal for loading into the truck bed and transportation to a distant point. After the driver positions the truck appropriately at the coal supply, the truck is placed in a stable condition, with the motor running, and the usual truck fluid pressure means 38 continues to operate. By appropriate valving (not shown in the drawings), fluid pressure is sent to cylinders 32 while the frame is in the lowermost position with the lifting means 20, as shown in FIG. 3. The cylinder acts to extend cylinder rods 35 and move lower leg 21 from lower stop means 40 so as to move the frame from a lowered position to a raised position, where the lifting means 20 are in the configuration shown in FIG. 4 and lower leg 21 abuts vertical stop means 30 and is continued to be urged thereagainst by cylinder 32. In this position, elongated leg supports 42 brace lower leg 21 and upper leg 24 against any lateral motion, and, thus, frame 7 stays in a raised but stable position.

A front-end loader operator will remove coal from the supply and place the bucket between the truck bed and the raised frame until the bed is filled. Thereafter, the appropriate valving is actuated so that the double-acting cylinder 32 moves the lifting means from the position shown in FIG. 4 to the position shown in FIG. 3, where lower leg 21 abuts and is retained by lower stop means 40, and wherein frame 7 is in the lowered position. If the coal so loaded is to be sampled, one or more of ports 51 (see FIG. 7) are opened by a hooked staff engaging lifting ring 53 for swinging cover 52 about hinge 55 to the position shown in FIG. 8. The auger operator then samples the coal, and thereafter, port cover 52 is returned to the position shown in FIG. 7, and the truck is then ready for transportation of the coal to a distant location, and without the difficulty of coal being displaced from the truck bed onto roadways and the like.

As can be seen from the above, the invention provides a very substantial advantage to the art, and the specific embodiments described above are but illustrative thereof. It will be quite apparent to those skilled in the art that many modifications of the specific embodiments described above may be made, and it is intended that such obvious embodiments be included within the scope and breadth of the annexed claims.

What is claimed is:

1. A vertically displaceable cover for a truck body open-top container bed having a bed bottom and bed walls with the uppermost portions of the bed walls forming a bed top perimeter, said cover including, in combination:
    (a) a rigid frame having frame members, the lowermost portion of said frame members forming a bottom perimeter, said frame bottom perimeter having a configuration which substantially corresponds to said bed top perimeter;
    (b) a cover means attached to said frame members and spanning said frame;
    (c) a pair of lifting means disposed on each opposite side of said truck bed, each lifting means having a lower leg with a lower leg end pivotably attached to a bed wall, and an upper leg with an upper leg end pivotably attached to a frame member, and a hinge between said legs, wherein, when said frame is in a lowered position, said frame is substantially adjacent to said bed top perimeter and the legs of said lifting means are in a somewhat horizontal or inclined and at least partially folded configuration around said hinge, and when said frame is in a raised position, said frame is substantially vertically displaced from said bed top perimeter and the legs of said lifting means are in a substantially vertical and unfolded configuration;
    (d) a vertically disposed stop means for each lifting means attached to a bed wall for receiving a leg of said lifting means when said frame is in the raised position;
    (e) a fluid pressure actuated cylinder associated with each of said lifting means, wherein a first end thereof is pivotably attached to a bed wall, and a second end thereof is pivotably attached to the lower leg of said lifting means, and wherein one of said first ends and said second ends is an extendable cylinder rod; and
    (f) fluid pressure means for supplying pressurized fluid to each of said cylinders for causing said cylinder rod to extend, for causing said frame in the lowered position to be moved to the raised position, for causing a portion of each of said pair of lifting means to be received into its respective vertically disposed stop means, and for continuing to urge that portion of said pair of lifting means into said stop means, whereby the cover is moved to and maintained in the raised position.

2. The cover of claim 1, wherein said frame is in the general configuration of a rectangle.

3. The cover of claim 2, wherein said frame has support cross-ribs spanning said frame from the longer sides of said rectangle.

4. The cover of claim 3, wherein said cover means is supported by said cross-ribs.

5. The cover of claim 4, wherein said cover means is metal sheeting.

6. The cover of claim 5, wherein said metal sheeting has at least one port therein for receiving or removing material into and from the bed.

7. The cover of claim 6, wherein said port has a removable or displaceable port cover thereover.

8. The cover of claim 7, wherein said port has a width of at least 24 inches.

9. The cover of claim 6, wherein there are at least three of said ports.

10. The cover of claim 1, wherein, when said cover is in the raised position, the separating distance between said bed top perimeter and said frame bottom perimeter is sufficient that a bucket of a front-end loader may be passed therebetween.

11. The cover of claim 10, where the separating distance is at least five feet.

12. The cover of claim 1, wherein each of said lifting means has at least two elongated leg supports attached to said lower leg near said hinge so that when said frame is in the raised position one of said legs is received in and supported by said leg supports.

13. The cover of claim 12, wherein there are three of said leg supports disposed on three sides of said lower leg not occupied by said hinge.

14. The cover of claim 1, wherein there is provided a generally horizontal or inclined lower stop means associated with each of said lifting means attached to said bed wall for receiving a leg of the lifting means when the frame is in the lowered position.

15. The cover of claim 1, wherein said fluid pressure means is a fluid pressure means associated with said truck body.

16. The cover of claim 15, wherein said fluid pressure means is a hydraulic pressure means associated with the truck body.

17. The cover of claim 15, wherein said fluid pressure means is an air pressure means associated with the truck body.

18. The cover of claim 1, wherein said hinge is substantially equidistant from said lower leg end and said upper leg end, so that when said frame is moved from the lowered position to the raised position the upper leg end always remains vertically disposed above said lower leg end.

19. The cover of claim 8, wherein said port is substantially circular and has a diameter of about 36 inches.

20. The cover of claim 19, wherein said port cover is hinged so that it may be displaced from said port.

* * * * *